Feb. 10, 1953      F. G. HODELL      2,627,778
SCREW AND CAP
Filed June 14, 1949
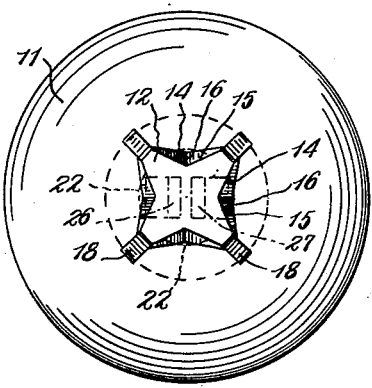
Fig. 1
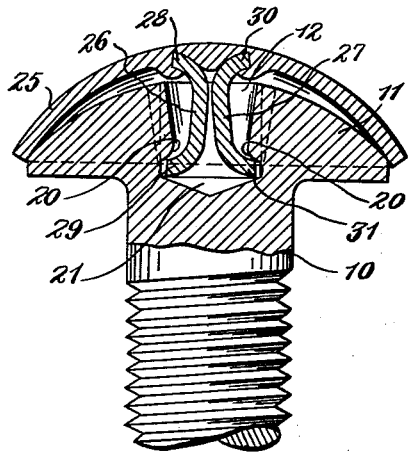
Fig. 2
Fig. 3
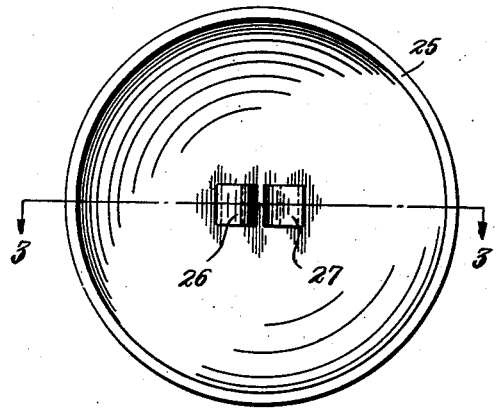
Fig. 4
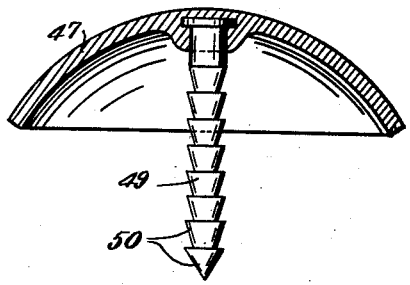
Fig. 6
Fig. 5
INVENTOR.
FREDERICK G. HODELL
BY Hudson, Boughton,
Williams, David & Hoffmann
ATTORNEYS Patented Feb. 10, 1953

2,627,778

UNITED STATES PATENT OFFICE 2,627,778

SCREW AND CAP

Frederick G. Hodell, Gates Mills, Ohio, assignor to The National Screw & Manufacturing Company, Cleveland, Ohio, a corporation of Ohio Application June 14, 1949, Serial No. 99,075

2 Claims. (Cl. 85—55)

The present invention relates to new and improved screws and attachable caps for covering their heads.

The principal object of the invention is the provision of a new and improved screw, including a head having a recess therein for the reception of a tool for rotating the screw and an undercut portion within the recess forming an abutment facing the end wall of the recess, and a cap for covering the screw head having a projection adapted to engage with the abutment for holding the cap to the screw head.

Another principal object of the invention is the provision of a new and improved screw, including a head having a recess for the reception of a tool for rotating the screw and a bore extending beyond the recess, and a cap for covering the head of the screw and having a shank adapted to extend into the bore, the shank including edges adapted to engage the walls of the bore to hold the cap to the screw head.

The invention resides in certain constructions and combinations and arrangements of parts and further objects and advantages will be apparent to those skilled in the art to which it relates from the following description of preferred embodiments described with reference to the accompanying drawings forming a part of this specification, in which Fig. 1 is a plan view of a screw embodying the invention;

Fig. 2 is a side view of part of the screw shown in Fig. 1, having a cap covering the head thereof, the head of the screw and the cap being shown in section;

Fig. 3 is a sectional view of the cap taken on line 3—3 of Fig. 4;

Fig. 4 is a bottom view of the cap;

Fig. 5 is a sectional view of part of a screw embodying another form of the invention and a cap attached to the screw; and Fig. 6 is a sectional view, with portions in elevation, of the cap shown in Fig. 5.

In general, the invention contemplates a screw and cap combination, the cap of which combination is attachable to the screw after the screw has been driven in a conventional manner to cover the driving connection in the screw head and present a more pleasing appearance.

One form of the invention shown contemplates a novel and improved screw including a head having a recess for the reception of a suitable tool for rotating the screw. The head is undercut within the recess to provide an abutment facing the inner end or bottom wall of the recess. The cap, which may cover either a portion or the entire outer surface of the screw head has an attaching member adapted to extend into the recess when the cap is on the screw head and which member includes a portion adapted to engage the abutment formed by the undercut to hold the cap to the screw head.

In another form of the invention, a new and improved screw is provided having a recess in the head thereof for the reception of a tool for rotating the screw, and a bore extending from the inner wall of the recess longitudinally of the screw, and the cap for covering a portion or the entire outer surface of the screw head has a shank integral therewith, which shank is adapted to extend into the bore. The shank has edges thereon for engaging the walls of the bore to hold the cap to the screw head.

Referring to Figs. 1 through 4 of the drawings, the screw 10 shown has an oval head 11, although the screw could have a head of any other suitable form. A socket or recess 12 is formed in the head, and the recess is preferably non-circular in form to provide a connection for a driving tool adapted to be inserted in the recess. For example, the socket may be similar to that of the well known Phillips type screw, one form of which is shown and described, together with a driver therefor, in United States Patent 2,046,837. In the present form, the recess 12 is generally square in outline, and each side of the recess has two wall planes 14, 15 which slope inwardly relative to the axis of the screw to form a taper to the recess and are angularly disposed relative to one another and intersect one another along line 16. An inwardly sloping groove 18 is formed in each corner of the recess and the grooves 18 extend into the screw the same distance as the side walls of the recess.

The screw is undercut adjacent to the bottom of the recess 12 to form an abutment 20 under each inwardly projecting side of the recess formed by the wall planes 14, 15, which abutments generally face the inner end or bottom wall 21 of the recess. Preferably, the abutments slope downwardly and outwardly relative to the axis of the screw.

The undercut portion may be formed by a suitable cutting tool such as that comprising a rotatable shank insertable into the recess 12 and having one or more laterally projecting cutting elements at the end thereof which may be inserted into the recess by angularly positioning the shank such that the cutting element or elements extend toward the corner or corners of the recess, as the case may be, when the shank is inserted into the recess. The cutting elements are shaped to provide the sloping contour of the abutments 20, as described, and when the shank of the cutting tool is rotated, the cutting elements undercut the sides of the recess defined by the wall planes 15, 16, as indicated by the dotted lines at 22.

A cap 25 is provided which may be formed of any suitable material, such as sheet metal or plastic, and which may be of any desirable shape for covering a part or the entire head of the screw and present a pleasing and decorative appearance. In the form shown, the cap is dome-shape and it covers the entire face of the screw head. The cap 25 includes two spring prongs 26, 27 which have laterally projecting feet 28, 29, 30, 31 at the ends thereof, respectively. One end of each of the prongs is attached to the central underside portion of the cap, as by swaging material of the cap over the feet 28, 30, respectively, so that the feet 29, 31 project outwardly and the outer ends of the prongs tend to spread. The spread of the prongs and the resiliency thereof are such that the prongs may be inserted in the mouth of the recess and yieldingly moved inwardly by the tapered walls of the recess as the cap is moved against the face of the screw head, and when the feet 29, 31 of the prongs are opposite the undercut portions of the recess, the prongs spread and move the feet beneath the abutments 20, as seen in Fig. 2. It will be seen that the cap may be quickly attached to the screw merely by inserting the prongs in the recess, and that the feet of the prongs cooperate with the inwardly facing abutments 20 to firmly hold the cap to the screw head. By forming the abutments 20 so that they slope as described, the feet of the prongs engage the abutments and tend to cam the prongs inwardly to maintain the cap in firm engagement with the screw head. It will be seen that this construction also eliminates the necessity of securing a precise dimensioning of the length of the prongs.

An alternative form of the invention is shown in Figs. 5 and 6, wherein a new and improved screw 40 is shown which is similar to the screw 10 and which includes a head 41 having a recess 42 therein, which is similar to the recess 12 of the screw 10 and is adapted to receive a tool for rotating the screw. The screw 40, however, is not undercut, but instead an axial bore 43 is formed therein, which extends longitudinally of the screw from the bottom wall 45 of the recess 42.

A cap 47 is adapted to cover the face of the screw head and it may be of any suitable material and form. In the present embodiment of the invention, the cap is dome shape and it includes a shank 49 which is suitably attached to the central underside of the cap proper, as by swaging, and which has a plurality of conical section formations 50 formed thereon. The conical sections are formed with the axes thereof coincident with the axis of the shank and the bases of the sections face the cap. The intersections of the sides of the conical sections with the bases thereof form circular sharp edges which lie in radial planes, relative to the shank, and which closely fit the walls of the bore 43. Preferably, the shank 49 is formed of material which is substantially harder than that of the screw, and when the shank 49 is inserted into the bore, the sloping sides of the conical sections tend to facilitate the insertion of the shank, but when the shank tends to move outwardly, the surfaces of the bases of the conical sections, which surfaces are normal to the walls of the bore 43, cause the edges 51 to tend to dig into the sides of the bore and hold the cap to the screw head.

Although the driver receiving recesses 12 and 42 in the forms of the screws shown, have been generally square in outline, they could be of any suitable non-circular form, such as a cross, or a slot.

It will be apparent that by the improved screws and caps, the heads of the screws may be quickly and easily covered by a decorative cap by inserting a part of the cap into the tool-receiving recess in the screw head.

While the preferred forms of the invention have been described in considerable detail, it will be apparent that the invention is not limited to the constructions shown, and it is my intention to cover hereby, all adaptations, modifications and changes therein, which come within the practice of those skilled in the art to which the invention relates and the scope of the appended claims.

Having thus described my invention, I claim:

1. The combination of a screw including a head having an axial recess therein for the reception of a driver, said recess having a generally square entrance with the sides thereof sloping inwardly axially of the screw and having the intermediate portions thereof projecting inwardly transversely of the axis of the screw, said portions being undercut to form outwardly sloping abutments facing the inner end of said recess, a cap adapted to substantially cover the outer surface of said head, and means for attaching said cap to said head comprising a pair of resilient prongs attached at one end to said cap and normally having the outer ends thereof spread and adapted to be inserted into said recess, said outer ends having outwardly projecting parts adapted to engage oppositely disposed intermediate side portions of said recess when initially inserted into said recess whereby said prongs are cammed inwardly by said side portions as said prongs are moved into said recess and said outwardly projecting parts of said prongs engaging said outwardly sloping abutments formed by said undercut portions when said cap is positioned substantially against the head of the screw.

2. A screw comprising a head having an axial recess therein for the reception of a driver, said recess having a generally square entrance with the sides thereof sloping inwardly axially of the screw and having the intermediate portions thereof projecting inwardly transversely of the axis of the screw, said intermediate portions being undercut to form outwardly sloping abutments facing the inner end of said recess and adapted to be engaged by laterally projecting end portions of prongs on a cap for covering said head inserted into said recess.

FREDERICK G. HODELL.

REFERENCES CITED

The following references are of record in the file of this patent:

UNITED STATES PATENTS

| Number | Name | Date |
| --- | --- | --- |
| 915,068 | Bowen | Mar. 16, 1909 |
| 1,814,966 | Rosenberg | July 14, 1931 |
| 2,084,079 | Clark | June 15, 1937 |
| 2,291,936 | Zabel | Aug. 4, 1942 |
| 2,331,608 | Hathorn | Oct. 12, 1943 |

FOREIGN PATENTS

| Number | Country | Date |
| --- | --- | --- |
| 18,503 | Great Britain | Aug. 14, 1913 |